(12) United States Patent
Meredith, III et al.

(10) Patent No.: US 12,351,664 B2
(45) Date of Patent: Jul. 8, 2025

(54) THERMALLY CROSSLINKED POLY(GLUCURONIC ACID)-CHITOSAN FILMS WITH HIGH OXYGEN AND WATER VAPOR BARRIER PROPERTIES

(71) Applicant: GEORGIA TECH RESEARCH CORPORATION, Atlanta, GA (US)

(72) Inventors: James Carson Meredith, III, Atlanta, GA (US); Chinmay Satam, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 642 days.

(21) Appl. No.: 17/765,287

(22) PCT Filed: Sep. 30, 2020

(86) PCT No.: PCT/US2020/053432
§ 371 (c)(1),
(2) Date: Mar. 30, 2022

(87) PCT Pub. No.: WO2021/067372
PCT Pub. Date: Apr. 8, 2021

(65) Prior Publication Data
US 2022/0356286 A1    Nov. 10, 2022

Related U.S. Application Data

(60) Provisional application No. 62/908,009, filed on Sep. 30, 2019.

(51) Int. Cl.
| | | |
|---|---|---|
| *B29C 70/02* | (2006.01) | |
| *C08F 251/02* | (2006.01) | |
| *C08J 3/24* | (2006.01) | |
| *C08J 5/18* | (2006.01) | |

(52) U.S. Cl.
CPC ............ *C08F 251/02* (2013.01); *C08J 3/246* (2013.01); *C08J 5/18* (2013.01); *C08F 2810/20* (2013.01); *C08J 2301/02* (2013.01); *C08J 2305/08* (2013.01); *C08J 2371/02* (2013.01)

(58) Field of Classification Search
None
See application file for complete search history.

(56) References Cited

U.S. PATENT DOCUMENTS

| | | |
|---|---|---|
| 6,524,348 B1 | 2/2003 | Jewell et al. |
| 8,007,911 B2 | 8/2011 | Ito et al. |
| 8,658,147 B2 | 2/2014 | Sannino et al. |
| 8,816,066 B2 | 8/2014 | Buchanan et al. |
| 9,345,809 B2 | 5/2016 | Falcone et al. |
| 2010/0234233 A1 | 9/2010 | Sannino et al. |
| 2010/0260809 A1 | 10/2010 | Valentova et al. |
| 2011/0098464 A1 | 4/2011 | Buchanan et al. |
| 2012/0295313 A1 | 11/2012 | Berglund et al. |

FOREIGN PATENT DOCUMENTS

| | | |
|---|---|---|
| JP | 2011099107 A1 | 5/2011 |
| JP | 2013510920 A | 3/2013 |
| WO | 2013/077354 A1 | 5/2013 |
| WO | 2015/007953 A1 | 1/2015 |

OTHER PUBLICATIONS

Office Action received in corresponding Japanese Application No. 2022-544631 dated Jul. 30, 2024.
Elboutachfaiti, R., et al., Polyglucuronic acids: Structures, functions and degrading enzymes. Carbohydrate Polymers, 2011. 84(1): p. 1-13.
Isogai, A. and Y. Kato, Preparation of Polyuronic Acid from Cellulose by TEMPO-mediated Oxidation. Cellulose, 1998. 5(3): p. 153-164.
Barikani, M., et al., Preparation and application of chitin and its derivatives: a review. Iranian Polymer Journal, 2014. 23(4): p. 307-326.
Hamed, I., F. Özogul, and J.M. Regenstein, Industrial applications of crustacean by-products (chitin, chitosan, and chitooligosaccharides): A review. Trends in Food Science & Technology, 2016. 48: p. 40-50.
Harish Prashanth, K.V. and R.N. Tharanathan, Crosslinked chitosan—preparation and characterization. Carbohydrate Research, 2006. 341(1): p. 169-173.
Rinaudo, M., New way to crosslink chitosan in aqueous solution. European Polymer Journal, 2010. 46(7): p. 1537-1544.
Monteiro, O.A.C. and C. Airoldi, Some studies of crosslinking chitosan—glutaraldehyde interaction in a homogeneous system. International Journal of Biological Macromolecules, 1999. 26(2): p. 119-128.
Zou, Q., J. Li, and Y. Li, Preparation and characterization of vanillin-crosslinked chitosan therapeutic bioactive microcarriers. International Journal of Biological Macromolecules, 2015. 79: p. 736-747.
Yang, J., et al., Cellulose-Chitosan Antibacterial Composite Films Prepared from LiBr Solution. Polymers, 2018. 10(10): p. 1058.
Isogai, A. and R.H. Atalla, Preparation of cellulose-chitosan polymer blends. Carbohydrate Polymers, 1992. 19(1): p. 25-28.
Alam, M.N. and L.P. Christopher, Natural Cellulose-Chitosan Cross-Linked Superabsorbent Hydrogels with Superior Swelling Properties. ACS Sustainable Chemistry & Engineering, 2018. 6(7): p. 8736-8742.
Tang, R., et al., Coupling chitosan and TEMPO-oxidized nanofibrilliated cellulose by electrostatic attraction and chemical reaction. Carbohydrate Polymers, 2018. 202: p. 84-90.
Soni, B., et al., Transparent bionanocomposite films based on chitosan and TEMPO-oxidized cellulose nanofibers with enhanced mechanical and barrier properties. Carbohydrate Polymers, 2016. 151: p. 779-789.

(Continued)

*Primary Examiner* — Katarzyna I Kolb
(74) *Attorney, Agent, or Firm* — Meunier Carlin & Curfman LLC (57) ABSTRACT

Disclosed are films and materials comprising poly(alkylene glycol)-chitosan and/or chitin-poly(glucuronic acid) and chitosan and/or chitin-poly(glucuronic acid). Methods of making such films, particularly involving thermally cross-linking poly(glucuronic acid) with chitosan, are disclosed.

19 Claims, 2 Drawing Sheets

(56) References Cited

OTHER PUBLICATIONS

Choo, K., et al., Preparation and Characterization of Polyvinyl Alcohol-Chitosan Composite Films Reinforced with Cellulose Nanofiber. Materials, 2016. 9(8): p. 644.

Yan, J.-K., et al., Formation and characterization of polyelectrolyte complex synthesized by chitosan and carboxylic curdlan for 5-fluorouracil delivery. International Journal of Biological Macromolecules, 2018. 107: p. 397-405.

Yan, L. and Z. Gao, Dissolving of cellulose in PEG/NaOH aqueous solution. Cellulose, 2008. 15(6): p. 789.

Tang, Z., et al., TEMPO-Oxidized Cellulose with High Degree of Oxidation. Polymers, 2017. 9(9): p. 421.

Sharma, S., et al., Thermally enhanced high performance cellulose nano fibril barrier membranes. RSC Advances, 2014. 4(85): p. 45136-45142.

Wu et al., Methods for producing chitin or chitosan nanofibers and barrier materials containing chitin or chitosan.

Extended European Search Report received in corresponding European Application No. 20871465.9 dated Sep. 28, 2023, 15 pages.

Satam, Chinmay C: "Chapter 5. Future Directions in High Oxygen and Water Vapor Barrier Materials—Thermally Treated Pol Y(Glucuronic Acid)-Chitosan Films", Applications of Cellulose and Chitin Based Materials as Sustainable Plastics, Mar. 20, 2020 (Mar. 20, 2020), pp. 1-200, XP093083472, Retrieved from the Internet: URL:https://repository.gatech.edu/entities/publication/86326819-a704-4602-9b51-df473122b65e.

International Search Report and Written Opinion dated Jan. 13, 2021, from International Application No. PCT/US2020/053432, 8 pages.

Georgia Tech Research Corporation. Alternative Plastic Solution Using Chitin Nanofibers (#8145), Jan. 6, 2020 [retrieved on Dec. 3, 2020]. Retrieved from the Internet:<URL:https://web.archive.org/web/20200106204804/https://industry.gatech.edu/technology/alternativeplastic-solution-using-chitin-nanofibers>. entire document.

THERMALLY CROSSLINKED POLY(GLUCURONIC ACID)-CHITOSAN FILMS WITH HIGH OXYGEN AND WATER VAPOR BARRIER PROPERTIES

CROSS-REFERENCE TO RELATED APPLICATION

This application is a national stage application filed under 35 U.S.C. § 371 of PCT/US2020/053432 filed Sep. 30, 2020, which claims priority to and the benefit of U.S. Provisional Patent Application No. 62/908,009 filed Sep. 30, 2019, each of which is hereby incorporated by reference herein in its entirety.

BACKGROUND

There is tremendous interest currently in producing packaging plastics from renewable resources. In particular, flexible plastic used to protect foods from oxygen and water, are generally not produced from a renewable resource and are difficult to recycle. Multiple layers are produced together in conventional packaging in order to achieve an acceptably low oxygen and water vapor transmission rate, as well as suitable mechanical properties. These layers are difficult to separate and recycle post-use. By deriving layers from biomass-sourced materials, a flexible film that is compostable or recyclable could be realized. Cellulose and chitin are the first- and second-most abundant poly(saccharides) occurring naturally and each are biodegradable and compostable through various means. There have been studies of cellulose and chitin-based films that have oxygen transmission properties suitable for food packaging, but in general, these suffer from high water absorption, which negatively impacts oxygen barrier properties. In addition, many of the materials are unacceptably brittle and difficult to manufacture scalably. Thus, there is interest in developing plastic films suitable for food packaging that are derived from cellulose or chitin, or other poly(saccharides) found in nature or agriculture, but which have combined oxygen and water vapor barrier properties and can be scalably manufactured. The compositions and methods disclosed herein address these and other needs.

SUMMARY

In accordance with the purposes of the disclosed materials and methods, as embodied and broadly described herein, the disclosed subject matter, in one aspect, relates to compounds, compositions and methods of making and using compounds and compositions. In specific aspects, the disclosed subject matter relates to films and materials comprising poly(alkylene glycol)-chitosan-poly(glucuronic acid) and chitosan-poly(glucuronic acid). Methods of making such films, particularly involving thermally crosslinking poly(glucuronic acid) with chitosan, are disclosed herein.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURE

The accompanying figure, which is incorporated in and constitutes a part of this specification, illustrates several aspects described below.

FIG. 2 contains FTIR spectra of four samples. These are Ch-PG films before (Ch-PG) and after (Ch-PG (HT)) the heat treatment (HT) and PEG-Ch-PG films before (PEG-Ch-PG) and after the heat treatment (PEG-Ch-PG (HT)) The effect of heat treatment (HT) on the appearance of additional amide bonds is shown. (Chitosan already has some amide bond present.)

DETAILED DESCRIPTION

The materials, compounds, compositions, and methods described herein may be understood more readily by reference to the following detailed description of specific aspects of the disclosed subject matter and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an inhibitor" includes mixtures of two or more such inhibitors, and the like.

"Optional" or "optionally" means that the subsequently described event or circumstance can or cannot occur, and that the description includes instances where the event or circumstance occurs and instances where it does not.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about."

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

As used herein, the term "composition" is intended to encompass a product comprising the specified ingredients in the specified amounts, as well as any product which results, directly or indirectly, from combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

Reference will now be made in detail to specific aspects of the disclosed materials, compounds, compositions, articles, and methods, examples of which are illustrated in the accompanying Examples and Figure.

Compositions and Methods

Disclosed herein are chitosan-poly(glucuronic acid) films or membranes with and without the presence of poly(alkylene glycol) or similar poly(alkylene oxide) polymers (e.g., poly(ethylene glycol) (PEG)). The amine and acid groups on chitosan and poly(glucuronic acid) can react act to form a crosslinked network polymer. The crosslinked network likely can speed solidification during manufacturing (through precipitation of high molecular mass product) and to limit swelling of the material with water vapor during use. The disclosed materials can be used for barrier applications in packaging since they can have low oxygen transmission rates and good water vapor transmission rates. These materials can be used in sustainably-sourced food, beverage and pharmaceutical packaging.

Poly(glucuronic Acid)

Poly(glucuronic acids) are homopolymers of glucuronic acid. They can be found naturally or can be produced synthetically by regioselective oxidation of natural glucans such as cellulose. Isogai et al. produced water soluble β-(1,4)-D-poly(glucuronic acid) (called cellouronic acid) acid by regioselective oxidation of $C_6$ primary hydroxyls of regenerated cellulose using 2,2,6,6-tetramethylpiperidine-1-oxyl radical (TEMPO) (Isogai, A., et al., Preparation of Polyuronic Acid from Cellulose by TEMPO-mediated Oxidation. *Cellulose,* 1998, 5(3):153-164). There are also several sources of naturally water soluble β-(1,4)-D-poly(glucuronic acids) that have also been identified, one among them being an exopolysaccharide excreted by *Sinorhizobium meliloti.*

The amount of poly(glucuronic acid) in the disclosed compositions can be at least about 5 wt. %, e.g., at least about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, or about 95 wt. %. In other examples, the amount of poly(glucuronic acid) in the disclosed compositions can be less than about 95 wt. %, e.g., less than about 90 wt. %, about 85 wt. %, about 80 wt. %, about 75 wt. %, about 70 wt. %, about 65 wt. %, about 60 wt. %, about 55 wt. %, about 50 wt. %, about 45 wt. %, about 40 wt. %, about 35 wt. %, about 30 wt. %, about 25 wt. %, about 20 wt. %, about 15 wt. %, about 10 wt. %, or about 5 wt. %. In still other examples, the amount of poly(glucuronic acid) in the disclosed compositions can be about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, or about 95 wt. %, where any of the stated values can form an upper or lower endpoint of a range. For example, the amount of poly(glucuronic acid) in the disclosed compositions can be from about 5 wt. % to about 95 wt. %, from about 25 wt. % to about 75 wt. %, from about 30 wt. % to about 50 wt. %, or from about 50 wt. % to about 70 wt. %. In specific examples, the amount of poly(glucuronic acid) in the disclosed compositions can be about 33 wt. % or about 50 wt. %.

Chitosan

Chitosan is derived from chitin, another abundantly available biopolymer with natural production being of the same order of magnitude as cellulose (Barikani, M., et al., Preparation and application of chitin and its derivatives: a review. *Iranian Polymer J.,* 2014, 23(4):307-326). Chitosan is a linear polysaccharide and a homopolymer of D-glucosamine and produced by deacetylation of chitin (Hamed, I., et al., Industrial applications of crustacean by-products (chitin, chitosan, and chitooligosaccharides): A review. *Trends Food Sci. Tech.,* 2016, 48:40-50). Due to the presence of secondary amino groups chitosan is soluble in dilute acids like acetic, formic, succinic etc. Chitin and chitosan can be thought of as the same material, but with different degrees of deacetylation and correspondingly different contents of secondary (—$NH_2$) amine group. Chitosan is chitin with a degree of acetylation of less than 50 mol %. Naturally-occurring chitin contains some fraction of chitosan distributed as a comonomer along the chain, and the process of extracting chitin from its parent source (such as crustacean exoskeleton) leads to some deacetylation, which can be carried out to an extreme degree to produce chitosan. While chitosan is soluble in dilute aqueous acids, chitin is insoluble and remains in solid fiber form. The solid fibers can be present as large aggregates or through processing, such as homogenization, can be reduced to nanocrystals or nanofibers. While the main example provided herein is with chitosan, the principle of the invention is applicable to other forms of chitin, including nanofibers and nanocrystals, which contain some quantity of secondary amine on their surfaces. Thus it is expressly contemplated that the disclosed methods and compositions can replace chitosan with chitin.

The amount of chitosan in the disclosed compositions can be at least about 5 wt. %, e.g., at least about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, or about 95 wt. %. In other examples, the amount of chitosan in the disclosed compositions can be less than about 95 wt. %, e.g., less than about 90 wt. %, about 85 wt. %, about 80 wt. %, about 75 wt. %, about 70 wt. %, about 65 wt. %, about 60 wt. %, about 55 wt. %, about 50 wt. %, about 45 wt. %, about 40 wt. %, about 35 wt. %, about 30 wt. %, about 25 wt. %, about 20 wt. %, about 15 wt. %, about 10 wt. %, or about 5 wt. %. In still other examples, the amount of chitosan in the disclosed compositions can be about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, or about 95 wt. %, where any of the stated values can form an upper or lower endpoint of a range. For example, the amount of chitosan in the disclosed compositions can be from about 5 wt. % to about 95 wt. %, from about 25 wt. % to about 75 wt. %, from about 30 wt. % to about 50 wt. %, or from about 50 wt. % to about 70 wt. %. In specific examples, the amount of chitosan in the disclosed compositions can be about 33 wt. % or about 50 wt. %.

Poly(alkylene Glycol)

The disclosed compositions can contain poly(alkylene glycol) or similar poly(alkylene oxide) polymers. Examples of such polymers include, but are not limited to, poly(ethylene glycol) and poly(propylene glycol). If present, the poly(alkylene glycol) or similar poly(alkylene oxide) polymer, e.g., poly(ethylene glycol), can have a molecular weight of from 1,000 to about 10,000 g/mol, e.g., from about 2,000 g/mol to about 8,000 g/mol, from about 4,000 g/mol to about 6,000 g/mol, from about 1,000 g/mol to about 7,000 g/mol, or from about 3,000 g/mol to 5,000 g/mol. The amount of poly(alkylene glycol) or similar poly(alkylene oxide) polymer in the disclosed compositions can be from about 0.1% to about 40 wt. %, e.g., about 0.5 wt. %, about 1 wt. %, about 5 wt. %, about 10 wt. %, about 15 wt. %, about 20 wt. %, about 25 wt. %, about 30 wt. %, about 35 wt. %, or about 40 wt. %, where any of the stated values can form an upper or lower endpoint of a range. In further examples, the amount of poly(alkylene glycol) or similar poly(alkylene oxide) polymer can be from about 0.1 wt. % to about 35 wt. %, from about 5 wt. % to about 30 wt. %, from about 10 wt. % to about 25 wt. %, from about 15 wt. % to about 40 wt. %, from about 20 wt. % to about 35 wt. %, or about 33 wt. %. In other examples, the composition does not contain any poly(alkylene glycol) or similar poly(alkylene oxide) polymer.

Crosslinking

In the disclosed compositions chitosan is crosslinked with poly(glucuronic acid). There are several methods to crosslink chitosan. Crosslinking of chitosan with itself (Harish Prashanth, K. V., et al., Tharanathan, Crosslinked chitosan—preparation and characterization. *Carbohydrate Res.*, 2006, 341(1):169-173) or other reagents like o-phthaldialdehyde (Rinaudo, M., New way to crosslink chitosan in aqueous solution. *Eur. Polymer J.*, 2010, 46(7):1537-1544), glutaraldehyde (Monteiro, O. A. C., et al., Some studies of crosslinking chitosan—glutaraldehyde interaction in a homogeneous system. *Intl. J. Biol. Macromol.*, 1999, 26(2):119-128), vanillin (Zou, Q., et al., Preparation and characterization of vanillin-crosslinked chitosan therapeutic bioactive microcarriers. *Intl. J. Biol. Macromol.*, 2015, 79:736-747), and many others is already studied. Similarly, cellulose and chitosan have been used to produce antibacterial composites (Yang, J., et al., Cellulose-Chitosan Antibacterial Composite Films Prepared from LiBr Solution. *Polymers*, 2018, 10(10):1058) and polymer blends of these two have been studied by Isogai (Isogai, A., et al., Preparation of cellulose-chitosan polymer blends. *Carbohydrate Polymers*, 1992, 19(1):25-28). Alam and Christopher produced crosslinked cellulose-chitosan crosslinked superabsorbent hydrogels by crosslinking partially-oxidized cellulose aldehyde with carboxymethylated chitosan (Alam, M. N., et al., Natural Cellulose-Chitosan Cross-Linked Superabsorbent Hydrogels with Superior Swelling Properties. *ACS Sustainable Chem. Eng.*, 2018, 6(7):8736-8742).

Tang et al. were able to couple chitosan and TEMPO oxidized cellulose nanofibrillated cellulose by utilizing electrostatic attractions between them at room temperature and then heating to produce covalent amide linkages (Tang, R., et al., Coupling chitosan and TEMPO-oxidized nanofibrilliated cellulose by electrostatic attraction and chemical reaction. *Carbohydrate Polymers*, 2018, 202:84-90). Notably, the cellulose used in Tang et al. was solid nanofibers of cellulose, the surface of which was lightly oxidized to modify just the surface with acid groups. Soni et al. produced transparent gas barrier films using TEMPO oxidized cellulose nanofibers and chitosan. They found that the films had better oxygen gas barrier properties than chitosan films and had better thermal and mechanical stability than chitosan films (Soni, B., et al., Transparent bionanocomposite films based on chitosan and TEMPO-oxidized cellulose nanofibers with enhanced mechanical and barrier properties. *Carbohydrate Polymers*, 2016, 151:779-789). Choo et al. produced Polyvinyl Alcohol-Chitosan Composite Films and reinforced them with TEMPO oxidized cellulose nanofibers (Choo, K., et al., Preparation and Characterization of Polyvinyl Alcohol-Chitosan Composite Films Reinforced with Cellulose Nanofiber. *Materials*, 2016, 9(8):644). Yan et al. prepared a polyelectrolyte complex by utilizing a negatively charged carboxylic curdlan (Cc) bearing a β-1,3-poly(glucuronic acid) structure and positively charged chitosan (Yan, J.-K., et al., Formation and characterization of polyelectrolyte complex synthesized by chitosan and carboxylic curdlan for 5-fluorouracil delivery. *Intl. J. Biol. Macromol.*, 2018, 107:397-405).

Sannino et al. (U.S. Pat. No. 8,658,147) describe a method for preparation of a polymer hydrogel, using a polycarboxylic acid (including poly(glucuronic acid)) as the crosslinking agent. Valentova (US Publication 2010-0260809) describe a chitosan-glucan complex for wound healing applications. Buchanan et al. (U.S. Pat. No. 8,816,066) describe methods of oxidation of cellulose ester interpolymers using TEMPO which can also be applied to chitosan. They also describe complexation between oppositely charged macromolecules using anionic cellulose ester interpolymers and chitosan for solubility modifiers of therapeutic agents.

As disclosed herein, the crosslinking reaction is between chitosan and poly(glucuronic acid) and is thermally initiated.

Specific Examples

Specific examples of compositions disclosed herein are provided in Table 1.

TABLE 1

| poly(glucuronic acid) (wt. %) | Chitosan (wt. %) | Poly(ethylene glycol) (wt. %) |
|---|---|---|
| 5 | 95 | 0 |
| 10 | 90 | 0 |
| 20 | 80 | 0 |
| 30 | 70 | 0 |
| 40 | 60 | 0 |
| 50 | 50 | 0 |
| 60 | 40 | 0 |
| 70 | 30 | 0 |
| 80 | 20 | 0 |
| 90 | 10 | 0 |
| 95 | 5 | 0 |
| 5 | 94 | 1 |
| 10 | 89 | 1 |
| 25 | 74 | 1 |
| 40 | 59 | 1 |
| 50 | 49 | 1 |
| 60 | 39 | 1 |
| 70 | 29 | 1 |
| 80 | 19 | 1 |
| 90 | 9 | 1 |
| 95 | 4 | 1 |
| 5 | 55 | 40 |
| 15 | 45 | 40 |
| 25 | 35 | 40 |
| 35 | 25 | 40 |
| 45 | 15 | 40 |
| 55 | 5 | 40 |

Methods

Methods for making the disclosed poly(alkylene glycol)-chitosan-poly(glucuronic acid) and chitosan-poly(glucuronic acid) are disclosed herein. In one aspect, disclosed herein is a method of making a poly(alkylene glycol)-chitosan-poly(glucuronic acid) film; comprising: contacting cellulose with NaOH and poly(alkylene glycol), e.g., poly(ethylene glycol), to form a solution comprising poly(alkylene glycol), NaOH and cellulose; contacting the solution comprising poly(alkylene glycol), NaOH and cellulose with 2,2,6,6-tetramethylpiperidine-1-oxyl radical and an oxidizing reagent to form a solution comprising poly(glucuronic acid) and poly(alkylene glycol); separating any 2,2,6,6-tetramethylpiperidine-1-oxyl radical, oxidizing reagent, and cellulose from the solution comprising poly(glucuronic acid) and poly(alkylene glycol); contacting the solution comprising poly(glucuronic acid) and poly(alkylene glycol) with an acidic solution of chitosan to form a solution comprising chitosan, poly(glucuronic acid), and poly(alkylene glycol); casting the solution comprising chitosan, poly(glucuronic acid), and poly(alkylene glycol) into a film; and heating the film to cross-link the poly(glucuronic acid) with the chitosan and yield a poly(alkylene glycol)-chitosan-poly(glucuronic acid) film. In specific embodiments, the cellulose and chitosan components are completely soluble when they undergo the thermal treatment and amide reaction.

In another aspect, disclosed herein is a method of making a chitosan-poly(glucuronic acid) film; comprising: contacting cellulose with NaOH and poly(alkylene glycol), e.g., poly(ethylene glycol), to form a solution comprising poly(alkylene glycol) and cellulose; contacting the solution comprising poly(alkylene glycol) and cellulose with 2,2,6,6-tetramethylpiperidine-1-oxyl radical and an oxidizing reagent to form a solution comprising poly(glucuronic acid) and poly(alkylene glycol); isolating poly(glucuronic acid) from any poly(alkylene glycol), 2,2,6,6-tetramethylpiperidine-1-oxyl radical, oxidizing reagent, cellulose, and poly(alkylene glycol) from the solution comprising poly(glucuronic acid); contacting the poly(glucuronic acid) with an acidic solution of chitosan to form a solution comprising chitosan and poly(glucuronic acid); casting the solution comprising chitosan and poly(glucuronic acid) into a film; and heating the film to cross-link the poly(glucuronic acid) with the chitosan and yield a chitosan-poly(glucuronic acid) film.

Contacting cellulose with NaOH and poly(alkylene glycol) to form a solution comprising poly(alkylene glycol) and cellulose can be performed as disclosed in Yan and Gao, who describe dissolving cellulose in 1 wt. % poly(ethylene glycol) (PEG)/9 wt. % NaOH solution (Yan, L., et al., Dissolving of cellulose in PEG/NaOH aqueous solution. *Cellulose*, 2008, 15(6):789, which is incorporated by reference herein in its entirety for its teachings on cellulose dissolution). They could produce cellulose solutions of 1-11.5 wt. % cellulose by mixing cellulose in the PEG/NaOH solution, freezing the mixture at −15° C. for 12 hours and then thawing the mixture under vigorous stirring to produce a homogenous cellulose solution. As used herein, the dissolution of cellulose using NaOH and poly(alkylene glycol) can be performed with any cellulose source. For example, the cellulose can be microcrystalline cellulose, nanocrystalline cellulose, cellulosic biomass, e.g., cotton, wood pulp, hemp, or linter. The NaOH can be provided as a solution to which the poly(alkylene glycol) is added or can be added to a solution of poly(alkylene glycol). Alternatively, cellulose can be added to the poly(alkylene glycol) with NaOH or then adding NaOH. Still further, the poly(alkylene glycol) can be added to cellulose with NaOH or then adding NaOH. The poly(alkylene glycol) can have an average MW of from about 1,000 g/mol to about 10,000 g/mol, e.g., from about 2,000 g/mol to about 8,000 g/mol, from about 4,000 g/mol to about 6,000 g/mol, from about 1,000 g/mol to about 7,000 g/mol, or from about 3,000 g/mol to about 5,000 g/mol. In certain examples, the solution is frozen, e.g., with liquid nitrogen, and then thawed with stirring to yield a clear cellulose solution with poly(alkylene glycol). The resulting solution can comprise from about 1 wt. % to about 12 wt. % cellulose, e.g., from about 1 wt. % to about 11 wt. %, from about 1 wt. % to about 10 wt. %, from about 1 wt. % to about 9 wt. %, from about 1 wt. % to about 8 wt. %, from about 1 wt. % to about 7 wt. %, from about 1 wt. % to about 6 wt. %, from about 5 wt. % to about 12 wt. %, from about 5 wt. % to about 11 wt. %, from about 5 wt. % to about 10 wt. %, or from about 10 wt. % to about 12 wt. %, of the solution.

While not wishing to be bound by theory, it is believed that starting with NaCNCs leads to a more facile treatment, because the CNCs are already chemically treated and the sulfonate groups come off readily to form the carboxylic acid group in poly(glucuronic acid) product. However, starting with a pulp may be cheaper, to avoid processing used to isolate the NaCNCs.

The solution comprising poly(alkylene glycol) and cellulose can be contacted with 2,2,6,6-tetramethylpiperidine-1-oxyl (TEMPO) radical and an oxidizing reagent to form a solution comprising poly(glucuronic acid) and poly(alkylene glycol). As an alternative to TEMPO, 2,2,5,5-tetramethylpyrroline-N-oxyl, and 4,4-dimethyloxazolidine-N-oxyl can be used. The oxidizing reagent can comprise sodium hypochlorite, nitrogen dioxide and periodate, metaperiodates and dichromic acid, or dichromate in oxalic acid.

Additional water-soluble alkali salts can also be included: water soluble salts of sodium or potassium, such as sodium bromide, sodium chloride, potassium bromide, potassium chloride, or sodium hydroxide. Tang et al. described producing water-soluble TEMPO oxidized cellulose by dissolving cellulose in a Urea/NaOH solution (Tang, Z., et al., TEMPO-Oxidized Cellulose with High Degree of Oxidation. *Polymers*, 2017, 9(9):421). The cellulose was mixed in a 7:12:81 NaOH:Urea:Water solution at −12° C. under vigorous stirring. The solution was centrifuged at 8000 rpm for 15 min to remove insoluble impurities and the solution was diluted with 40 L of water. The suspension was then filtered and washed with deionized water until the pH was close to neutral. The suspension was then cooled in liquid nitrogen for 30 min and freeze-dried at −50° C. for three days to give NaOH/urea-treated cellulose which was oxidized utilizing TEMPO-sodium bromide-sodium hypochlorite to yield water-soluble poly(glucuronic acid). Unlike the process of Tang et al., the cellulose solution herein comprises poly(alkylene glycol) and NaOH.

Any 2,2,6,6-tetramethylpiperidine-1-oxyl radical, oxidizing reagent, and cellulose can be separated from the solution comprising poly(glucuronic acid) and poly(alkylene glycol) or similar poly(alkylene oxide) polymer. This can be accomplished by centrifuging or dialyzing the solution against water. The dialyzing step can be performed multiple times. In some embodiments, the poly(glucuronic acid) can be separated from the poly(alkylene glycol) or similar poly(alkylene oxide) polymer by precipitating and then isolating the poly(glucuronic acid). Precipitation can be induced by adding a precipitation reagent such as ethanol or propanol.

Next the solution comprising poly(glucuronic acid) and (optionally) poly(alkylene glycol) or similar poly(alkylene oxide) polymer can be contacted with an acidic solution of chitosan to form a solution comprising chitosan, poly(glucuronic acid), and (optionally) poly(alkylene glycol) or similar poly(alkylene oxide) polymer. The acidic solution of chitosan can be at a pH of from 2 to 4, e.g., from 2.5 to 3.5, or 3.

The solution comprising chitosan, poly(glucuronic acid), and (optionally) poly(alkylene glycol) or similar poly(alkylene oxide) polymer can then be casted into a film. Casting can be performed by pouring the solution into a mold, onto a substrate, spinning the solution onto a substrate, spray coating on a substrate, dip coating on a substrate, or by continuous coating including doctor-blade, knife-edge, slot-die, flexographic or gravure coating methods. The resulting wet film is then dried at elevated temperature. The resulting is then dried.

The final step involves heating the film to cross-link the poly(glucuronic acid) with the chitosan and yield a chitosan-poly(glucuronic acid) film with or without poly(alkylene glycol) or similar poly(alkylene oxide) polymer. Heating can be performed at from 35 to 250° C., for example from 50 to 225° C., from 70 to 200° C., from 90 to 175° C., from 110 to 150° C., from 75 to 250° C., from 100 to 200° C., from 35 to 100° C., or from 150 to 250° C.

The resulting compositions can then be used to form films, wrappers, packing materials, packaging films, bandages, clothing, and other useful articles.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

ACS grade sodium hydroxide pellets and ACS grade crystalline sodium bromide was obtained from VWR (Radnor, PA). Solid poly(ethylene glycol) 2000 was obtained from Fluka Biochemika (Steinheim, Germany). TEMPO free radical was obtained from Alfa Aesar (Ward Hill, MA). Deionized (D.I.) water was obtained from a Thermo scientific GenPure UV/UF xCAD plus water purification system. Freeze dried cellulose nanocrystals (CNCs) were obtained from Forest Products lab (Madison, WI)). Glacial acetic acid was purchased from Sigma Aldrich (St. Louis, MO). Chitosan powder (min. 90% deacetylation) was obtained from Spectrum Chemicals (Gardena, CA). Sodium hypochlorite was obtained as 6% solution from Publix (Lakeland, FL).

Example 1: PEG-Chitosan-poly(glucuronic Acid) Film 9 g of NaOH pellets and 1 g of PEG 2000 were dissolved in 90 mL of D.I. water. To it 1 g of freeze dried CNCs were added. Liquid nitrogen was used to freeze the solution solid and the frozen solution was kept in a 0° C. refrigerator for 24 hours. The frozen solution was thawed under vigorous stirring to yield a clear cellulose solution. To it 12.7 g of sodium bromide and 0.16 g TEMPO were added. After complete dissolution, 114 mL of 6% sodium hypochlorite was added to the solution over 10 minutes and the solution was reacted for 6 hours. The reaction was terminated with 5 mL of ethanol. The resulting solution was dialyzed against 500 volumes of D.I. water till the pH was 7 to remove TEMPO, sodium bromide, and sodium hydroxide.

Enough glacial acetic acid was dissolved in water to yield a pH 3 solution. Chitosan was dissolved in this pH 3 acidified water as 1% solution. 26 mL of the dialyzed cellulose-PEG solution was mixed with 24 mL of chitosan solution. The solution was stirred for 10 minutes at 200 RPM and then solution cast in a plastic (polyethylene) boat. The films were air dried over the course of 14 days to yield free standing films.

The PEG-Chitosan-poly(glucuronic acid) films (PEG-Ch-PG) was then heated in a vacuum oven at 150° C. for 3 hours to yield thermally treated films (PEG-Ch-PG (HT)). During the thermal treatment it is expected that chitosan and glucuronic acid react to form amide bond linkages. These conditions are obtained from Sharma et al. (Sharma, S., et al., Thermally enhanced high performance cellulose nano fibril barrier membranes. *RSC Advances*, 2014, 4(85): 45136-45142).

Example 2: Chitosan-poly(glucuronic Acid) Film

The dialyzed cellulose solution was mixed with ethanol to precipitate the poly(glucuronic acid). The precipitate was separated by centrifugation of the suspension at 3000 RPM for 10 minutes. The precipitate was washed with ethanol and the suspension was again centrifuged at the same conditions. The procedure repeated thrice to yield pure poly(glucuronic acid). The poly(glucuronic acid) was dissolved in water as a 1 wt. % solution. 26 mL of this solution was mixed with 24 mL of the chitosan solution described previously. The resulting poly(glucuronic acid) and chitosan solution was then solution casted as described previously to yield free standing films.

The Chitosan-poly(glucuronic acid) (Ch-PG) film was then heated in a vacuum oven at 150° C. for 3 hours to yield thermally treated films (Ch-PG (HT)). As noted above, during the thermal treatment it is expected that chitosan and glucuronic acid react to form amide bond linkages. These conditions are obtained from Sharma et al. (Sharma, S., et al., Thermally enhanced high performance cellulose nano fibril barrier membranes. *RSC Advances*, 2014, 4(85): 45136-45142).

Example 3: Permeability Assay

Oxygen gas permeability of the free-standing films was measured using a MOCON OXTRAN instrument MOCON OXTRAN 1/50 at 50% relative humidity (RH) and 23° C. while water vapor transmission of the free-standing films was obtained using a MOCON PERMATRAN-W 1/50 instrument at 30-60% RH and 23° C. The thickness of free-standing films was measured using a micrometer.

The solid films formed from the procedures above were tested for oxygen and water vapor transmission rates. Table 2 presents results of the oxygen transmission rate in the form of a permeability that normalizes for thickness and oxygen pressure difference. The values of 0.20 and 0.76, for PEG-Ch-PG (HT) and Ch-PG (HT), respectively, are commercially relevant and comparable to conventional barrier packaging films like poly(ethylene terephthalate), poly(vinylidene chloride) and poly(ethylene-co-vinyl alcohol). A 1 mil (25 mm) thick film of PEG-Ch-PG (HT) would at 100 kPa oxygen pressure difference have an oxygen transmission rate of 0.62 $cm^3/m^2/day$, within the limit usually considered to be a high barrier material (1 $cm^3/m^2/day$) at 23° C. and 50% relative humidity.

TABLE 2

Thickness and Oxygen Transmission of films

| | Thickness μm | Oxygen Transmission $cm^3$-μm/$m^2$/day/KPa |
|---|---|---|
| PEG-Ch-PG (HT) | 94 ± 14 | 0.20 |
| Ch-PG (HT) | 73 ± 6 | 0.76 |

Figure 1:
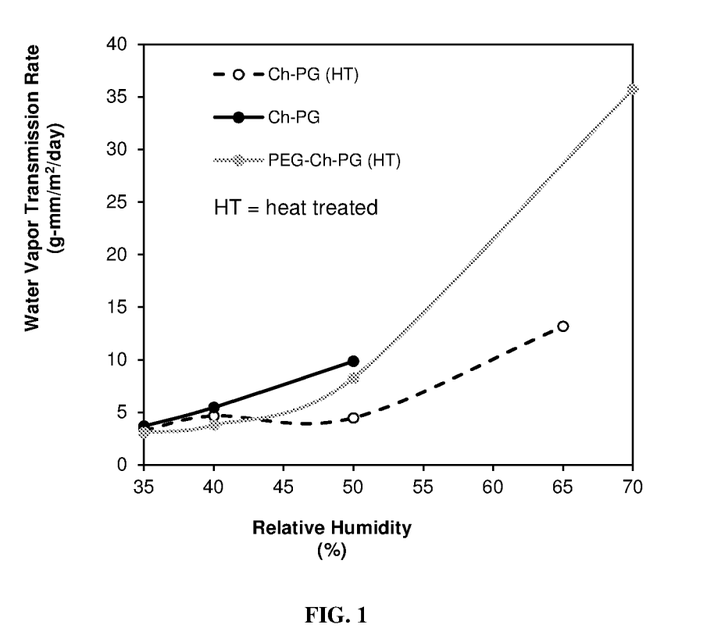
FIG. 1 is a graph of water vapor transmission of various films disclosed herein. It shows the positive effect on lowering WVTR with the addition of the heat treatment.

FIG. 1 presents the water vapor transmission rate (WVTR) that has been normalized to film thickness. Up to 50% RH, the Ch-PG (HT) film has a WVTR between 3-5 g mm/$m^2$/day, which is similar to that of PET plastic. The Ch-PG (HT) film has considerably lower WVTR as humidity becomes elevated than the Ch-PH film that was not heat treated. The PEG-Ch-PG (HT) material has similar WVTR at humidity below 40% RH but suffers in performance (higher WVTR) more than Ch-PH as RH is raised.

Example 4: Fourier-Transform Infrared Spectroscopy (FTIR)

Figure 2:
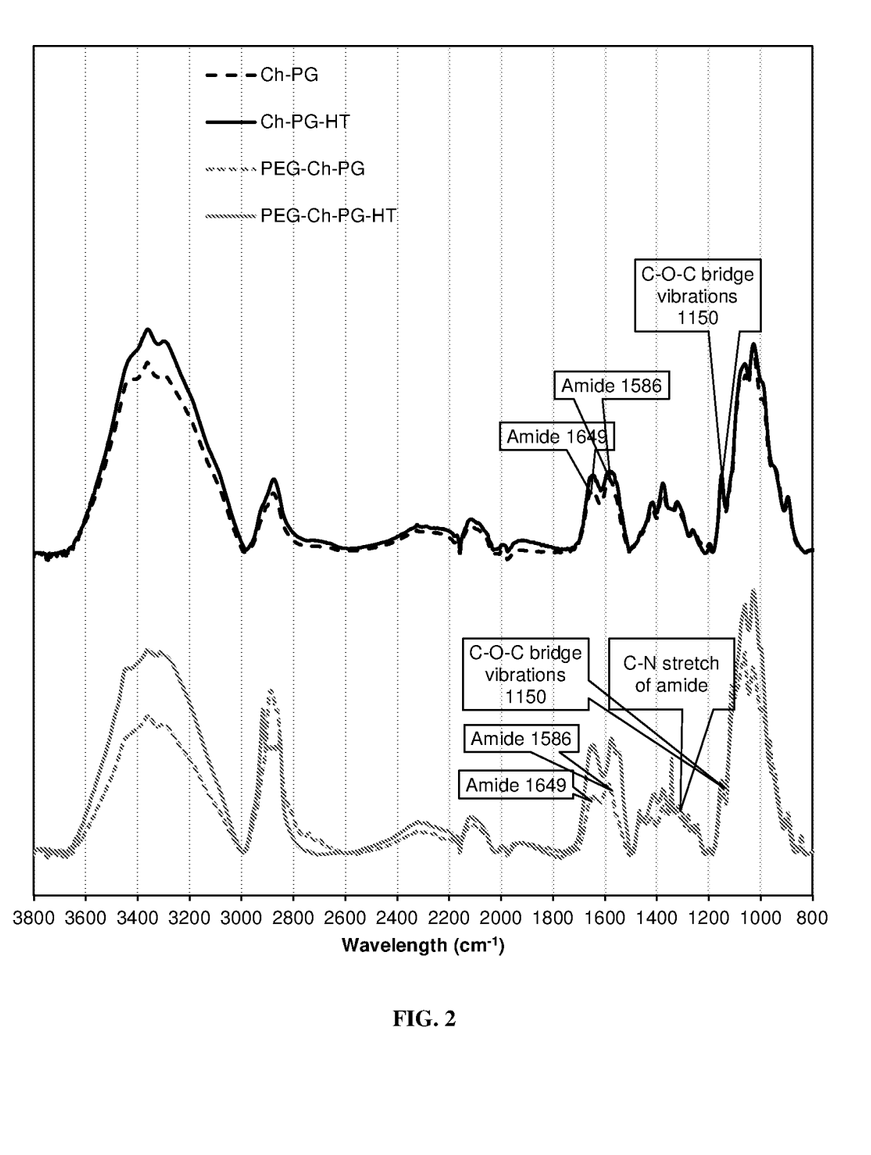

FIG. 2 shows FTIR spectra obtained for four samples. These are Ch-PG films before (Ch-PG) and after (Ch-PG (HT)) the heat treatment (HT) and PEG-Ch-PG films before (PEG-Ch-PG) and after the heat treatment (PEG-Ch-PG (HT)). For the heat-treated PEG-Ch-PG (HT) films, the FTIR spectra was normalized by using the C—O—C bridge vibrations at 1150 $cm^{-1}$ to enable quantitative comparisons between the spectra. The hydroxyl peaks for the PEG-Ch-PG (HT) films indicate a larger fraction of hydrogen bonded —OH, accompanied by the reappearance of a small peak at 3450 $cm^{-1}$ corresponding to weak hydrogen bonding, compared to PEG-Ch-PG films not heat treated. The intensity of bands associated with amides between 1500-1700 $cm^{-1}$ is increased along with the increase in intensity of the peak at 1320 $cm^{-1}$ C—N stretch of the amide-III pointing to increased amide bond formation.

The FTIR spectra of Ch-PG films are similar to PEG-Ch-PG films where there is a noted absence of free hydrogen bond stretching at wavenumbers greater than 3450 $cm^{-1}$. The bands corresponding to amides appear in the 1500-1700 $cm^{-1}$ range similar to PEG-Ch-PG films. The FTIR data for the Ch-PG (HT) and Ch-PG films is normalized such that the intensity of the C—O—C bridge vibrations is the same to allow quantitative comparisons. On heat treatment of the Ch-PG (HT), the hydrogen bonding hydroxyl peak intensity is increased but the peak associated with the weak hydrogen bonding is not as distinct as seen in heat treated PEG-Ch-PG (HT) Similarly, the peaks associated with the amides is also increased with heat treatment in Ch-PG (HT) compared to Ch-PG, as also observed for PEG-Ch-PG (HT) versus PEG-Ch-PG.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of making a poly(alkylene glycol)-chitosan-poly(glucuronic acid) film; comprising:
    contacting cellulose with NaOH and poly(alkylene glycol) to form a solution comprising poly(alkylene glycol), NaOH and cellulose;
    contacting the solution comprising poly(alkylene glycol) and cellulose with 2,2,6,6-tetramethylpiperidine-1-oxyl radical and an oxidizing reagent to form a solution comprising poly(glucuronic acid) and poly(alkylene glycol);
    separating any 2,2,6,6-tetramethylpiperidine-1-oxyl radical, oxidizing reagent, and cellulose from the solution comprising poly(glucuronic acid) and poly(alkylene glycol);
    contacting the solution comprising poly(glucuronic acid) and poly(alkylene glycol) with an acidic solution of chitosan to form a solution comprising chitosan, poly(glucuronic acid), and poly(alkylene glycol);
    casting or coating the solution comprising chitosan, poly(glucuronic acid), and poly(alkylene glycol) into a film; and
    heating the film to crosslink the poly(glucuronic acid) with the chitosan and yield a poly(alkylene glycol)-chitosan-poly(glucuronic acid) film.

2. A method of making a chitosan-poly(glucuronic acid) film; comprising:
    contacting cellulose with NaOH and poly(alkylene glycol) to form a solution comprising poly(alkylene glycol), NaOH and cellulose;
    contacting the solution comprising poly(alkylene glycol) and cellulose with 2,2,6,6-tetramethylpiperidine-1-oxyl radical and an oxidizing reagent to form a solution comprising poly(glucuronic acid) and poly(alkylene glycol);
    isolating poly(glucuronic acid) from any poly(alkylene glycol), 2,2,6,6-tetramethylpiperidine-1-oxyl radical, oxidizing reagent, cellulose, and poly(alkylene glycol) from the solution comprising poly(glucuronic acid) and poly(alkylene glycol);

contacting the poly(glucuronic acid) with an acidic solution of chitosan to form a solution comprising chitosan and poly(glucuronic acid);

casting or coating the solution comprising chitosan and poly(glucuronic acid) into a film; and heating the film to crosslink the poly(glucuronic acid) with the chitosan and yield a chitosan-poly(glucuronic acid) film.

3. A method of making a poly(alkylene glycol)-chitin-poly(glucuronic acid) film; comprising:

contacting cellulose with NaOH and poly(alkylene glycol) to form a solution comprising poly(alkylene glycol), NaOH and cellulose;

contacting the solution comprising poly(alkylene glycol) and cellulose with 2,2,6,6-tetramethylpiperidine-1-oxyl radical and an oxidizing reagent to form a solution comprising poly(glucuronic acid) and poly(alkylene glycol);

separating any 2,2,6,6-tetramethylpiperidine-1-oxyl radical, oxidizing reagent, and cellulose from the solution comprising poly(glucuronic acid) and poly(alkylene glycol);

contacting the solution comprising poly(glucuronic acid) and poly(alkylene glycol) with an acidic solution of chitin to form a solution comprising chitin, poly(glucuronic acid), and poly(alkylene glycol);

casting or coating the solution comprising chitin, poly(glucuronic acid), and poly(alkylene glycol) into a film; and heating the film to crosslink the poly(glucuronic acid) with the chitin and yield a poly(alkylene glycol)-chitin-poly(glucuronic acid) film.

4. A method of making a chitin-poly(glucuronic acid) film; comprising:

contacting cellulose with NaOH and poly(alkylene glycol) to form a solution comprising poly(alkylene glycol), NaOH and cellulose;

contacting the solution comprising poly(alkylene glycol) and cellulose with 2,2,6,6-tetramethylpiperidine-1-oxyl radical and an oxidizing reagent to form a solution comprising poly(glucuronic acid) and poly(alkylene glycol);

isolating poly(glucuronic acid) from any 2,2,6,6-tetramethylpiperidine-1-oxyl radical, oxidizing reagent, cellulose, and poly(alkylene glycol) from the solution comprising poly(glucuronic acid) and poly(alkylene glycol);

contacting the poly(glucuronic acid) with an acidic solution of chitin to form a solution comprising chitin and poly(glucuronic acid);

casting or coating the solution comprising chitin and poly(glucuronic acid) into a film; and heating the film to crosslink the poly(glucuronic acid) with the chitin and yield a chitin-poly(glucuronic acid) film.

5. The method of claim 2, when the solution comprising poly(alkylene glycol) and cellulose is frozen and then thawed before contacting with 2,2,6,6-tetramethylpiperidine-1-oxyl radical and the oxidizing reagent.

6. The method of claim 2, wherein the oxidizing reagent is sodium hypochlorite.

7. The method of claim 1, wherein 2,2,6,6-tetramethylpiperidine-1-oxyl radical, oxidizing reagent, and cellulose are separated from the solution comprising poly(glucuronic acid) and poly(alkylene glycol) by dialyzing against water.

8. The method of claim 2, wherein the acidic solution of chitosan has a pH of from about 2 to about 4.

9. The method of claim 2, wherein the poly(alkylene glycol) is poly(ethylene glycol).

10. The method of claim 2, wherein the poly(glucuronic acid) and poly(alkylene glycol) solution is mixed with a precipitation agent to thereby precipitate poly(glucuronic acid).

11. The method of claim 2, wherein the film is heated from 70 to 200° C.

12. The method of claim 3, when the solution comprising poly(alkylene glycol) and cellulose is frozen and then thawed before contacting with 2,2,6,6-tetramethylpiperidine-1-oxyl radical and the oxidizing reagent.

13. The method of claim 3, wherein the oxidizing reagent is sodium hypochlorite.

14. The method of claim 3, wherein 2,2,6,6-tetramethylpiperidine-1-oxyl radical, oxidizing reagent, and cellulose are separated from the solution comprising poly(glucuronic acid) and poly(alkylene glycol) by dialyzing against water.

15. The method of claim 3, wherein the acidic solution of chitin has a pH of from about 2 to about 4.

16. The method of claim 3, wherein the poly(alkylene glycol) is poly(ethylene glycol).

17. The method of claim 3, wherein the poly(glucuronic acid) and poly(alkylene glycol) solution is mixed with a precipitation agent to thereby precipitate poly(glucuronic acid).

18. The method of claim 3, wherein the poly(alkylene glycol) is poly(ethylene glycol).

19. The method of claim 3, wherein the film is heated from 70 to 200° C.

* * * * *